Figure 1:
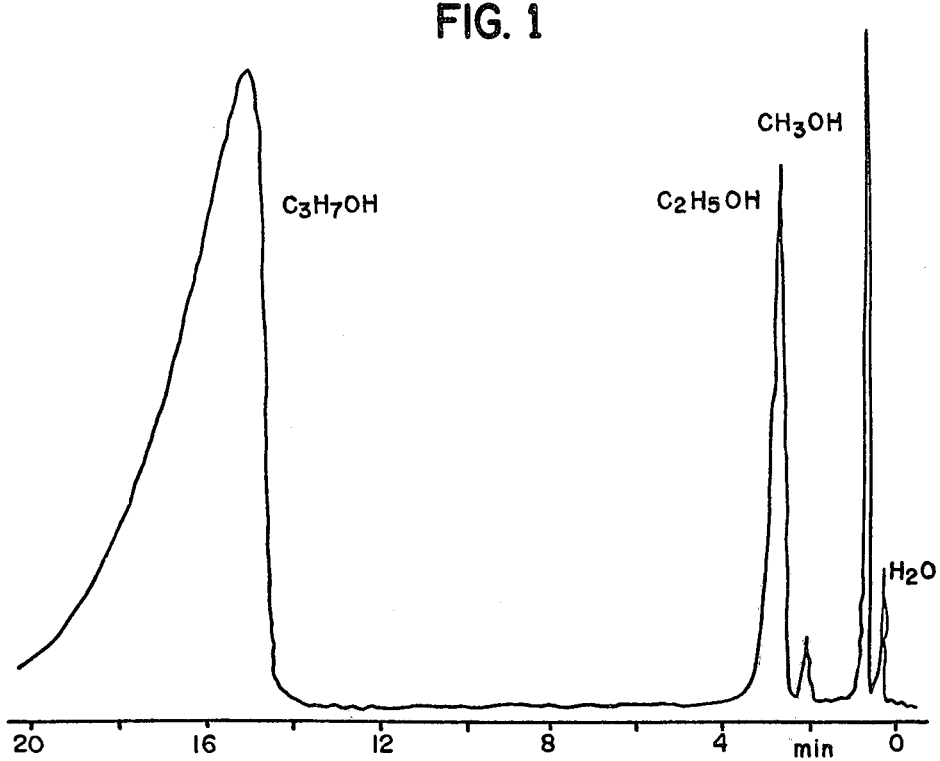

United States Patent [19]

Ripperger et al.

[11] 3,960,768

[45] June 1, 1976

[54] PRODUCTION OF CARBON BY ELIMINATING HYDROGEN HALIDE FROM POLYMERIZED HALOHYDROCARBONS

[75] Inventors: Willi Ripperger; Willi Oettinger, both of Ludwigshafen; Rudolf Kaiser, Bad Durkheim; Klaus Pfitzner; Richard Adolf Palm, both of Ludwigshafen, all of Germany

[73] Assignee: Sirmac Ltd., Dusseldorfer, Germany

[22] Filed: July 5, 1974

[21] Appl. No.: 486,059

Related U.S. Application Data

[63] Continuation of Ser. No. 221,658, Jan. 28, 1972, abandoned.

[52] U.S. Cl. .................................. 252/444; 55/67; 201/2.5; 201/25; 264/29; 252/421; 252/422; 252/445; 423/445; 423/447; 423/449
[51] Int. Cl.$^2$ ..................... B01J 21/18; B01J 31/10
[58] Field of Search ................... 252/421, 445, 444; 423/449, 445, 447; 201/25, 2.5; 55/67, 386; 264/24

[56] References Cited
UNITED STATES PATENTS

| | | | |
|---|---|---|---|
| 2,944,031 | 7/1960 | Mason | 252/421 |
| 3,258,363 | 6/1966 | Lieb et al. | 423/449 |
| 3,395,094 | 7/1968 | Weisz | 208/62 |
| 3,516,791 | 6/1970 | Evans et al. | 252/421 |
| 3,716,339 | 2/1973 | Shigaki et al. | 201/25 |
| 3,801,513 | 4/1974 | Munzner et al. | 252/421 |
| 3,829,558 | 8/1974 | Banks et al. | 201/25 |
| 3,852,429 | 12/1974 | Murayama et al. | 423/449 |

OTHER PUBLICATIONS

Nature — vol. 211, No. 5053; Sept. 3, 1966; pp. 1082–1083 Bailey A. and Everett D. H.
Transactions of the Faraday Society — vol. 50; 1954 pp. 740–748; Dacey J. R. & Thomas D. G.
Carbon — vol. 8, No. 6; Dec. 1970; pp. 761–772 Adams L. B., Boucher E. A. & Everett D. H.

*Primary Examiner*—Winston A. Douglas
*Assistant Examiner*—P. E. Konopka

[57] ABSTRACT

Hard abrasion-resistant carbon is obtained from polymerized halohydrocarbons by elimination of hydrogen halide in a two-stage process carried out so that in the first decomposition stage, which is carried out at temperatures within the range from 140° to 250°C, a definite amount (not less than 5% by weight and not more than 50% by weight) of the total amount of hydrogen halide capable of being split off is removed. Appropriately shaped end products can be obtained by using raw materials having a globular, cylindrical or other shape. The carbon obtained is suitable as the stationary phase for chromatographic separation and analysis of mixtures.

6 Claims, 2 Drawing Figures

PRODUCTION OF CARBON BY ELIMINATING HYDROGEN HALIDE FROM POLYMERIZED HALOHYDROCARBONS

This is a continuation of application Ser. No. 221,658, filed Jan. 28, 1972, now abandoned.

This invention relates to a process for the production of hard, abrasion-resistant carbon by eliminating hydrogen halide from halogen-containing polymerized halohydrocarbons in more than one stage and its use particularly as stationary phase in the chromatographic separation and analysis of mixtures of substances.

The production of carbon by thermal treatment of polymerized hydrocarbons of the type known under the registered Trade Mark SARAN is described in "Mineral Industries", volume 35, No. 4, January 1966.

The use of a carbon obtained by eliminating hydrogen halide from halogen-containing polymerized halohydrocarbons as a stationary phase for the chromatographic separation and analysis of mixtures is described in Chromatographia, volume 3, page 38 (1970) (cf. also German Patent application No. P 19 35 500.1-52).

The use of polyvinylidene chloride has proved to be particularly advantageous for the production of a carbon suitable for chromatography. The production of the carbon (called C-molecular sieve because of its special properties) is carried out in one stage by thermal decomposition of the polymer in the range from 100° to 1000°C.

Under the conditions described above and due to the considerable elimination of halogen, a foam-like highly porous carbon having low hardness and resistance to abrasion is obtained. The bulk density of this carbon, hereinafter referred to as C-molecular sieve, is within the range from about 0.2 to 0.3 g/ml and the specific surface area according to the BET method is from 900 to 1200 m$^2$/g.

The yield of carbon, based on polyvinylidene chloride used, should be 24.7% in theory. Considerable waste occurs during comminution and sieving of the much expanded carbon however so that the yield of useful carbon in practice is often only 10 to 11% by weight of the polyvinylidene chloride used.

There is therefore the problem of preventing the foaming or expansion of the carbon in the thermal decomposition of the polymerized halohydrocarbon so that a carbon is obtained having a high density, great hardness and greater resistance to abrasion and having a specific surface area of more than 900 m$^2$/g.

We have now found that hard, abrasion-resistant carbon can be obtained by elimination of hydrogen halide from a polymerized halohydrocarbon by carrying out the elimination of the hydrogen halide in more than one process stage.

It has been found that the carbon can be obtained in a desirable form by starting from preshaped polymerized halohydrocarbons.

It has proved to be advantageous in the process to remove the whole of the hydrogen halide in two or three stages, the exact maintenance of the conditions in the first stage being of particular importance for obtaining a hard, abrasion-resistant end product.

Elimination of hydrogen halide may be carried out by treatment with an alkali metal amide dissolved in liquid ammonia, purely thermally or with the assistance of catalysts. Combinations of the said methods may also be used. It is preferred however to eliminate the hydrogen halide thermally.

The polymerized halohydrocarbon is heated in the first stage of the process to a temperature within the range from 140° to 250°C, advantageously from 140° to 200°C, particularly from 170° to 200°C; these conditions are maintained for about one hour to ten hours. The temperature and time are correlated within the said temperature ranges so that from not less than 5% by weight to not more than 50% by weight, preferably from 30 to 45% by weight, of hydrogen halide is eliminated with reference to the total amount of hydrogen halide which can be eliminated from the polymerized halohydrocarbon.

Elimination of hydrogen halide in the first stage of the process may be carried out at subatmospheric, atmospheric or superatmospheric pressure. It may be carried out in an oxidizing, reducing or inert gas atmosphere in the absence or presence of scavenging gas. Compounds which accelerate elimination of HCl may be added to the scavenging gas or to the polymerized halohydrocarbon.

In the second stage — the pyrolysis stage — the polymerized halohydrocarbon pretreated in the first stage is heated to a temperature above 250°C, advantageously from 700° to 1400°C, preferably from 600° to 950°C.

It is advantageous to raise the temperature very slowly from 250° to 350°C during the heating up in order to achieve a uniform grain structure. The thermal treatment in the second stage preferably takes place in the presence of an inert or reducing gas such as nitrogen or hydrogen and heating is advantageously continued until the residual halogen content in the carbon has fallen to a value of less than 250° ppm, particularly to a value of less than 50 ppm. The duration of the treatment can be shortened by the use of a higher temperature.

It has proved to be advantageous to follow the second treatment stage by an aftertreatment stage in which the carbon is graphitized by heating to more than 1800°C in an inert or reducing atmosphere. Graphitized carbons mainly have importance as carrier materials for other stationary phases in chromatography.

C-molecular sieves prepared by elimination of hydrogen halide from polymerized halohydrocarbons may be subjected to further activating or modifying treatments.

These treatments may be carried out either in combination with the first or second coking stage or separately. The following are suitable as activating or modifying treatments: Treatment with steam or $CO_2$ at a temperature above 100°C at atmospheric or superatmospheric pressure; by this treatment the surface area of the carbon molecular sieve is increased and the adsorptive capacity is increased. Alcohols such as methanol or its homologs may be used instead of steam.

Wettability of the carbon molecular sieves with water and other solvents may be changed by the formation of surface oxides. These surface oxides influence the polarity and adsorptive properties of the carbon obtained. Surface oxides of carbon can be prepared by the action of oxidizing agents, as for example air, $NO_2$, $CO_2$ or nitric acid at temperatures below 300°C.

Separation properties, adsorptive capacity and reactivity of carbon molecular sieves may also be modified by pyrolytic deposition. This is preferably carried out by adding carbon-containing compounds such as, for example, methane and its homologs, acetylene, benzene or carbon tetrachloride to the scavenging gas in the second coking stage. Above 700°C these compounds are decomposed on the carbon molecular sieve and result in deposition of pyrocarbon on the surface and in the pores of the carbon molecular sieve. The said compounds are conveniently mixed with the scavenging gas in concentrations of from 0.05 to 20% by volume.

The following are suitable polymerized halohydrocarbons for the elimination of hydrogen halide: polyvinyl chloride, polyvinylidene chloride, copolymers of vinylidene chloride with vinyl chloride or with acrylic esters, chlorinated polyolefins, afterchlorinated polyvinyl chloride and mixtures of two or more of the specified halogen containing polymers. Polyvinylidene chloride has proved to be particuarly suitable.

Articles of hard abrasion-resistant carbon of high purity having the desired shape are obtained by starting from preshaped polymerized halohydrocarbons. Suitable shaped articles include for example tablets, spheres, cylinders, tubes, plates, sheeting, film, filaments, threads or netting.

These preshaped starting materials may be prepared in the usual manner, for example by pressing the raw material at room temperature or elevated temperature. Spherical starting materials may be obtained direct in the polymerization and copolymerization of vinylidene chloride and vinyl chloride by conventional bead polymerization.

In the two-stage process described above an accurately foreseeable shrinkage takes place in which the shape of the polymerized halohydrocarbon used is retained. The extent of the shrinkage depends not only on the polymerized halohydrocarbon used but also substantially on the course of the temperature in the two coking stages and on the density of the shaped article used. It is preferred that the linear shrinkage should not exceed 50%.

Carbon molecular sieves prepared in this way may be used as the stationary phase in thin layer chromatography, column chromatography, gas chromatography and variants of the same, and the range of use may extend from the lowest to the currently highest possible working temperature.

The carbon obtained by thermal treatment of polymerized halohydrocarbons may also be used as an addition to other stationary phases, i.e. mixed with other conventional solid stationary phases or as a carrier for other stationary phases. The said carbon molecular sieve as the stationary phase in chromatography permits separations of inorganic and organic substances and, because of the inert properties of carbon, also separations of corrosive substances which hitherto could only be achieved at considerable expense, for example in multistage separation, and even then not satisfactorily.

A hard spherical sorption and carrier material for gas and liquid chromatography is advantageously prepared for chromatographic purposes. The shape, hardness and surface structure and also the resistance to high temperatures are better than in the case of all hitherto known carrier materials for chromatography. The sorption behavior may be varied within wide limits by thermal, chemical and thermochemical aftertreatment.

Carbon molecular sieves of the prior art (cf. chromatographia, loc. cit.) and of the present invention differ in shape, mechanical strength and behavior.

Mechanical hardness is tested as follows (there being no internationally recognized method for testing the hardness of very small particles): the force which is necessary to effect total deformation of a particle of the two types of molecular sieve. A glass plane is used as the boundary surface through which the force acts on the particle. The following values (the mean values of ten measurements) result from deformation of a particle having a diameter of 0.2 mm:

| C-molecular sieve according to: | Force in pounds ($= 1\ g \times 0.981\ cm^2/s$) |
| --- | --- |
| (a) Prior art (Chromatographia, loc.cit.) type B | 47 |
| (b) The present application type C | 317 |

This means that the molecular sieve prepared according to the process of the invention is more dimensionally stable or harder by one order of magnitude than the C-molecular sieve of the prior art.

Resistance to attrition of the said molecular sieves is determined by vibration screening. Molecular sieves of types B and C are compared with one another in continuous vibration on a steel sieve for a period of 15 minutes. The attrition or abrasion is measured in % by weight based on the amount introduced. The following values are obtained:

| C-molecular sieve according to: | Attrition in % by weight of the amount used |
| --- | --- |
| Prior art, type B (cf. Chromat. loc.cit.) | 3% |
| The present application type C | not measurable |

Figure 2:
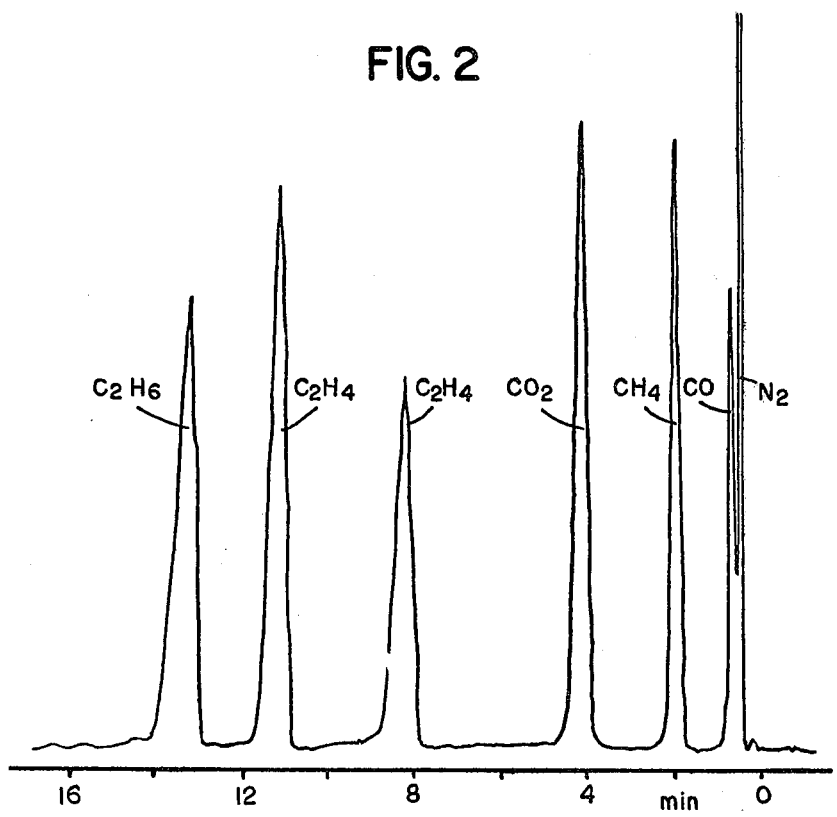

The behavior of carbon molecular sieves prepared according to the invention in chromatography essentially corresponds to that of the carbon molecular sieves of the prior art (cf. Chromatographia loc. cit.) as FIGS. 1 and 2 verify.

The Figures are gas chromatograms for the isothermal separation of alcohols (1) FIG. 1; 250°C and for the temperature-programmed separation of hydrocarbons (2) FIG. 2 temperature-programmed 40° to 180°C on carbon molecular sieves prepared according to the present process at 10°C per minute. (The separating column has an internal width of 2 mm and a length of 1 meter and is filled with 0.8 g of carbon molecular sieve in the form of small particles.)

The following Examples 1 and 2 illustrate the production of carbon molecular sieves by eliminating hydrogen halide from polymerized halohydrocarbons using polyvinylidene chloride as an example.

EXAMPLE 1

400 g of polyvinylidene chloride having a particle size of 300 to 400 microns and a bulk density of 0.87 g/ml is heated up to 185°C in a tube furnace under flowing nitrogen (40 l/h) and kept at this temperature for two hours. 42.6% of the hydrogen chloride theoretically capable of being eliminated is eliminated. Then it is heated further to 900°C and kept at this constant temperature for 5 hours.

24.6% of carbon is obtained based on the polyvinylidene chloride used. It is a fine spherical hard and lustrous product having a bulk density of 0.62 g/ml and the following distribution:

300 to 400 microns: 5%
200 to 300 microns: 87%
100 to 200 microns: 7% less than 100 microns: 1%

The BET surface area is 960 m²/g and the chlorine content is less than 20 ppm.

EXAMPLE 2

Polyvinylidene chloride powder having a particle size of from 40 to 300 microns (the maximum of the particle size distribution lying between 100 and 150 microns) is pressed into tablets of the size 4.5 mm × 4 mm.

The tablets are heated for 5 hours at 170°C in air in a laboratory drying cabinet. 38.5% of the eliminatable HCl is eliminated. Then it is heated up in a tube furnace under flowing nitrogen (40 l/h) to 950°C and allowed to remain at this temperature for 8 hours.

After coking, the tablets are shrunk by 45% in height and 41% in diameter. They have a black appearance with a metallic luster and a compressive strength of 1750 kg/cm². The surface area is 916.6 m²/g, the micropore volume is determined at 0.79 ccm/g and the macropore volume at 0.09 ccm/g. The bulk density is 0.603 g/ml. The chlorine content is less than 10 ppm.

We claim:

1. A process for producing hard, abrasion-resistant spherical carbon from beads of polyvinylidene chloride produced directly by bead polymerization consisting essentially of heating said beads of polyvinylidene chloride to a temperature of from about 140° to about 250°C in a first stage under flowing nitrogen for from about 1 hour to about 10 hours whereby from 30 to 45% of the hydrogen chloride that is capable of being removed is eliminated and thereafter raising the treatment temperature very slowly from about 250° to about 350°C in the transition stage between the first and a second stage, and further heating said beads in said second stage to a temperature within the range of about 600° to about 950°C in the presence of an inert or reducing gas, wherein carbon-containing compounds selected from the group consisting of methane, homologs of methane, acetylene, benzene and carbon tetrachloride are mixed with the inert or reducing gas of said second stage in concentrations of from about 0.05 to about 20% by volume to decompose and deposit pyrocarbon on the surface and in the pores of said beads, said heating being continued until the residual chlorine content of the beads has been reduced to less than 250 ppm, said beads undergoing linear shrinkage during said heating stages of up to 50%.

2. A process as set forth in claim 1 wherein the temperature in the first stage is maintained at from 170°–200°C and wherein the residual chlorine content of the beads is reduced to less than 50ppm in the second stage.

3. The product obtained according to the process set forth in claim 2.

4. A process as set forth in claim 2 wherein the second stage of the process is followed by an aftertreatment stage in which the carbon is heated to more than about 1800°C in an inert or reducing atmosphere.

5. A process as set forth in claim 1 wherein said inert gas is nitrogen.

6. A process as set forth in claim 1 wherein said reducing gas is hydrogen.

* * * * *